United States Patent
Ren et al.

(10) Patent No.: US 11,168,913 B2
(45) Date of Patent: Nov. 9, 2021

(54) CONTROL METHOD AND CONTROL DEVICE OF AIR CONDITIONER AND AIR CONDITIONER

(71) Applicants: HEFEI MIDEA HEATING & VENTILATING EQUIPMENT CO., LTD., Hefei (CN); GD MIDEA HEATING & VENTILATING EQUIPMENT CO., LTD., Foshan (CN)

(72) Inventors: Linxing Ren, Hefei (CN); Yongfeng Xu, Hefei (CN); Xihua Ma, Hefei (CN)

(73) Assignees: HEFEI MIDEA HEATING & VENTILATING EQUIPMENT CO., LTD., Anhui (CN); GD MIDEA HEATING & VENTILATING EQUIPMENT CO., LTD., Foshan (CN)

( * ) Notice: Subject to any disclaimer, the term of this patent is extended or adjusted under 35 U.S.C. 154(b) by 31 days.

(21) Appl. No.: 16/618,570

(22) PCT Filed: Jun. 3, 2019

(86) PCT No.: PCT/CN2019/089860
§ 371 (c)(1),
(2) Date: Dec. 2, 2019

(87) PCT Pub. No.: WO2020/024695
PCT Pub. Date: Feb. 6, 2020

(65) Prior Publication Data
US 2020/0232669 A1 Jul. 23, 2020

(30) Foreign Application Priority Data
Aug. 3, 2018 (CN) .......................... 201810878616.7

(51) Int. Cl.
*F24F 11/49* (2018.01)
*F24F 11/84* (2018.01)
(Continued)

(52) U.S. Cl.
CPC .............. *F24F 11/49* (2018.01); *F24F 11/61* (2018.01); *F24F 11/64* (2018.01); *F24F 11/65* (2018.01);
(Continued)

(58) Field of Classification Search
CPC .. F24F 11/48; F24F 11/61; F24F 11/89; F24F 11/65; F24F 11/88; F24F 11/64;
(Continued)

(56) References Cited

U.S. PATENT DOCUMENTS

| 5,263,333 A * | 11/1993 | Kubo | F24F 3/065 62/160 |
| 2016/0159198 A1 * | 6/2016 | Tang | B60H 1/00885 700/300 |
| 2016/0200176 A1 * | 7/2016 | Stanke | B60H 1/00978 62/115 |

FOREIGN PATENT DOCUMENTS

| CA | 2594637 C | 3/2016 |
| CN | 101749825 A | 6/2010 |

(Continued)

OTHER PUBLICATIONS

International Search Report and Written Opinion dated Aug. 23, 2019 from State Intellectual Property Office of the P.R. China.
(Continued)

*Primary Examiner* — Kidest Bahta
(74) *Attorney, Agent, or Firm* — Dilworth & Barrese, LLP.; Michael J. Musella, Esq.

(57) ABSTRACT

Provided are a control method and control device of an air conditioner and an air conditioner. The control method of the
(Continued)

air conditioner includes: when a starting capacity of an indoor unit is lower than or equal to a capacity threshold value and a low-voltage protection signal is received, an opening degree of an electronic expansion valve is adjusted. By applying the technical solution provided in embodiments of the present disclosure, when the starting capacity of the indoor unit is low, a shutdown of the air conditioner caused by a false alarm of the low-voltage protection signal due to the fact that an operating load of the air conditioner is low and the opening degree of the electronic expansion valve is low can be avoided, frequent false shutdown caused by the fact that the starting capacity of the indoor unit of the air conditioner is low is avoided, the reliability of the air conditioner can be effectively improved, and the comfort of a user for using the air conditioner is further improved.

18 Claims, 7 Drawing Sheets

(51) Int. Cl.
| | |
|---|---|
| *F24F 11/64* | (2018.01) |
| *F24F 11/88* | (2018.01) |
| *F24F 11/65* | (2018.01) |
| *F24F 11/89* | (2018.01) |
| *F24F 11/61* | (2018.01) |
| *G05B 13/02* | (2006.01) |

(52) U.S. Cl.
CPC .............. *F24F 11/84* (2018.01); *F24F 11/88* (2018.01); *F24F 11/89* (2018.01); *G05B 13/021* (2013.01)

(58) Field of Classification Search
CPC ... F24F 11/84; F24F 11/49; G05B 2219/2614; G05B 15/02; G05B 13/021
See application file for complete search history.

(56) References Cited

FOREIGN PATENT DOCUMENTS

| | | |
|---|---|---|
| CN | 101949570 A | 1/2011 |
| CN | 102353117 A | 2/2012 |
| CN | 106352445 A | 1/2017 |
| CN | 106482405 A | 3/2017 |
| CN | 106594978 A | 4/2017 |
| CN | 106813322 A | 6/2017 |
| CN | 107091517 A | 8/2017 |
| CN | 107314499 A | 11/2017 |
| CN | 109084421 A | 12/2018 |
| JP | H0395342 A | 4/1991 |
| JP | 2010164270 A | 7/2010 |
| JP | 2018112350 A | 7/2018 |

OTHER PUBLICATIONS

Office Action issued in CN201810878616.7 dated Feb. 3, 2020 and English Translation.

Xing, Wang; Common Control Rules of VRV System and the Analysis of Typical Malfunction of Control Systems, Nov. 1, 2014, pp. 111-115.

Yaoxi et al.;Experimental study on low temperature start-up performance of Air-source cold and hot water Heat pump system; vol. 9, pp. 110-114.

* cited by examiner

CONTROL METHOD AND CONTROL DEVICE OF AIR CONDITIONER AND AIR CONDITIONER

CROSS-REFERENCE TO RELATED APPLICATIONS

The present disclosure is a national stage filing of international application PCT/CN2019/089860, flied on Jun. 3, 2019, and claims priority to Chinese Patent Application No. 201810878616.7 entitled "Control Method and Control Device of Air Conditioner and Air Conditioner" filed on Aug. 3, 2018 by GD Midea Heating & Ventilating Equipment Co., Ltd. and Midea Group Co., Ltd., the entire contents of each or which are incorporated herein by reference.

FIELD

The present disclosure relates to the technical field of air conditioning control, in particular to a control method of an air conditioner, a control device of the air conditioner and the air conditioner.

BACKGROUND

At present, in the related art, the multi-connection air conditioning system is generally matched with a plurality of indoor units to operate. When only a few indoor units are switched on or only one indoor unit is switched on, it sometimes happens that the opening degree of the electronic expansion valve of the indoor unit is too low, low pressure is caused to be too low, and thus the outdoor unit mistakenly triggers low pressure protection to cause fault shutdown. The air conditioning system is operated again after the fault is automatically recovered, and low pressure protection is caused to occur again for the same reason. The air conditioning system is frequently started and stopped. When the air-conditioning system works in a low-temperature refrigeration mode, the frequency of the false shutdown phenomenon is particularly frequent, and the reliability of the air-conditioning system and the comfort of a user using the air conditioner are seriously affected.

SUMMARY

The present disclosure aims to solve at least one of the technical problems in the related art to some extent.

Therefore, the present disclosure provides in embodiments a control method of an air conditioner, which can effectively improve the reliability of the air conditioner and improve the comfort of a user in using the air conditioner.

The present disclosure also provides in embodiments a control device of an air conditioner and the air conditioner.

In order to solve the problems, in the control method of an air conditioner of an embodiment according to the first aspect of the present disclosure, the air conditioner comprising at least one indoor unit and one outdoor unit, the control method comprises: when a starting capacity of the indoor unit is lower than or equal to a capacity threshold value and a low-voltage protection signal is received, adjusting an opening degree of an electronic expansion valve.

In the technical solution, the starting capacity of the indoor unit of the air conditioner is lower than or equal to the capacity threshold value, so that the operating load of the air conditioner is lower, and the opening degree of the electronic expansion valve is lower. When the starting capacity of the indoor unit of the air conditioner is lower than or equal to the capacity threshold value, and a low-voltage protection signal of the outdoor unit of the air conditioner is received, the low-voltage protection signal has higher probability of false alarm caused by low operating load of the air conditioner and low opening degree of the electronic expansion valve, the air conditioner is not controlled to stop and remove obstacles, but the opening degree of the electronic expansion valve is adjusted. If the false alarm is caused by low operating load of the air conditioner and low opening degree of the electronic expansion valve, after the opening degree of the electronic expansion valve is adjusted, the refrigerant further fills the pipeline. At the moment, the low pressure of the outdoor unit rises to be higher than the low-pressure protection threshold value, low-pressure faults are eliminated, the outdoor unit does not send low-pressure protection signals, and the air conditioner can resume normal operation. By applying the technical solution provided in embodiments of the present disclosure, when the starting capacity of the indoor unit is low, the shutdown of the air conditioner caused by the false alarm of a low-voltage protection signal due to the fact that the operating load of the air conditioner is low and the opening degree of the electronic expansion valve is low can be avoided, the frequent false shutdown caused by the fact that the starting capacity of the indoor unit of the air conditioner is low is avoided, the reliability of the air conditioner can be effectively improved, and the comfort of a user for using the air conditioner is further improved.

Specifically, when the air conditioner is started, whether the starting capacity of the indoor unit of the air conditioner is lower than or equal to a capacity threshold value is judged. If the starting capacity of the indoor unit is lower than or equal to the capacity threshold value, when a low-voltage protection signal of the outdoor unit is received, the electronic expansion valves of the indoor unit and the outdoor unit are controlled to increase the opening degree, the operating load of the air conditioner is increased, and the quantity of refrigerant passing through the electronic expansion valves is increased. When the refrigerant further fills the pipeline, the low-voltage fault of the outdoor unit is eliminated, the outdoor unit does not send a low-voltage protection signal, the air conditioner is controlled to resume normal operation, frequent shutdown of the air conditioner due to false alarm of the low-voltage protection signal is avoided, and the reliability of the air conditioner and the comfortableness of a user for using the air conditioner are improved.

In addition, the control method of an air conditioner provided in embodiments of the present disclosure can also have the following additional technical features: in the technical solution, preferably, the control method of an air conditioner further comprises: after the opening degree of the electronic expansion valve is adjusted, starting timing; when the timing reaches a first preset time length, if a low-voltage protection signal is still received, continuing timing; otherwise, controlling the first protection accumulation value to be increased by 1, and controlling the air conditioner to continue to operate.

According to the technical solution, since the refrigerant enters the pipeline for a certain time after the opening degree of the electronic expansion valve is increased, the timing is started after the opening degree of the electronic expansion valve is adjusted, and whether the low-voltage fault of the outdoor unit is eliminated or not is judged after the timing reaches a first preset time length; if the low-voltage fault of the outdoor unit is not eliminated, namely the low-voltage protection signal is still received, timing is continued, and waiting is performed for the refrigerant to further enter the pipeline; if the low-voltage fault of the outdoor unit is eliminated, a low-voltage protection signal is not received any more, which indicates that the air conditioner can resume normal operation at the moment. 1 is added to the first protection accumulation value at the moment, the number of times that the fault takes a first preset time length and then resumes normal operation are recorded, and the air conditioner is controlled to continue to operate.

In any of the above technical solutions, preferably after the step of continuing timing, the method further comprises: when the timing reaches a second preset time length, if the low-voltage protection signal is still received, controlling the air conditioner to stop operating and sending out prompt information; otherwise, controlling the second protection accumulation value to be increased by 1, and controlling the air conditioner to continue to operate.

In the technical solution, when the opening degree of the electronic expansion valve is adjusted and the timing reaches a first preset time length, but the low-voltage fault of the outdoor unit is not eliminated, and the timing is continued and reaches a second preset time length, whether the low-voltage fault of the outdoor unit is eliminated or not is judged again. If the low-voltage protection signal is still received at the moment, the low-voltage fault is not false alarm caused by low starting capacity of the indoor unit, so the air conditioner needs to be controlled to stop operating and send out prompt information. The user is prompted that the air conditioner has a fault, and the fault cannot be automatically eliminated, so that the user contacts maintenance personnel for door maintenance at the first time; if the timing reaches the second preset time length, the low-voltage fault of the outdoor unit is eliminated, and the low-voltage protection signal is not received any more, which indicates that the air conditioner can resume normal operation at the moment. 1 is added to the second protection accumulation value at the moment, the number of times that the fault takes a second preset time length and then resumes normal operation are recorded, and the air conditioner is controlled to continue to operate.

In any technical solution, preferably, in the continuing timing step, simultaneously, the method further comprises: reducing operating frequency of outdoor unit.

According to the technical solution, with the operating frequency of the outdoor unit of the air conditioner being higher, the corresponding pressure value in the normal pipe is higher. The operating frequency of the outdoor unit is further reduced under the condition that a low-voltage fault is not eliminated after a first preset time length, the low-voltage fault can be recovered more quickly, and the air conditioner returns to normal operation more quickly.

In any of the above technical solutions, preferably, while the step of adjusting the opening degree of the electronic expansion valve is performed, the control method further comprises: removing a correction value for the indoor unit; while the step of controlling the air conditioner to continue to operate is performed, the control method further comprises: restoring the correction value for indoor unit.

In the technical solution, in the practical application of the air conditioner, there is an correction value for the indoor unit aiming at sensor error values, such as an ambient temperature correction amount, an exhaust temperature correction amount, an evaporator outlet temperature correction amount and the like, and the correction amounts enable the operating frequency of the outdoor unit to be additionally increased in the original techniques so as to ensure that the temperature regulation effect of the air conditioner is consistent with user settings. Therefore, when the outdoor unit sends out a low-voltage protection signal, the correction value for the indoor unit is removed, so that the operating frequency of the outdoor unit returns to the original operating frequency, and the speed of low-voltage fault removal can be accelerated. Meanwhile, after the low-voltage fault is eliminated, while the step of controlling the air conditioner to continuously operate is performed, the correction value for the indoor unit is restored, so that the temperature regulation effect of the air conditioner is guaranteed.

In any of the above technical solutions, preferably after the step of controlling the air conditioner to continue to operate, the control method further comprises: continuously acquiring the first protection accumulation value and the second protection accumulation value in a third preset time length; the first protection accumulation value reaching a first protection threshold value, and/or the second protection accumulation value reaching a second protection threshold value, controlling the air conditioner to stop operating and sending out prompt information.

According to the technical solution, the first protection accumulation value and the second protection accumulation value are continuously acquired within a third preset time length, and when the first protection accumulation value reaches the first protection threshold value and/or the second protection accumulation value reaches the second protection threshold value, the air conditioner is indicated to have too many times of low-voltage faults in a short time, and low-voltage protection signals are not false alarms caused by low starting capacity of the indoor unit. Therefore, the air conditioner is controlled to stop operating, fault prompt information is sent to a user to prompt the user that the air conditioner has a fault and the fault cannot be automatically eliminated, so that the user contacts maintenance personnel to go on door for maintenance at first time.

In any of the foresaid technical solutions, preferably, the step of adjusting the opening degree of the electronic expansion valve is as follows: adjusting an opening of the electronic expansion valve to an initial opening degree; or adjusting an opening of the electronic expansion valve to a maximum opening degree; or adjusting an opening of the electronic expansion valve to increase a preset opening degree.

In the technical solution, the step of adjusting the opening degree of the electronic expansion valve specifically comprises adjusting the opening of the electronic expansion valve to an initial opening degree so as to enable the air conditioner to operate in an initial state; or adjusting the opening degree of the electronic expansion valve is specifically to adjust the opening of the electronic expansion valve to the maximum opening degree, so that low-pressure faults can be eliminated at the fastest speed; or the step of adjusting the opening degree of the electronic expansion valve specifically comprises adjusting the electronic expansion valve to increase the preset opening degree, so that low-pressure faults can be automatically eliminated according to the preset step.

In order to solve the problems, the second aspect of the present disclosure provides in embodiments a control device for an air conditioner, the air conditioner comprising at least one indoor unit and one outdoor unit, the control device comprising: a memory and a processor; wherein the memory is used for storing a computer program; and the processor is configured to execute the computer program to: when the starting capacity of the indoor unit is lower than or equal to the capacity threshold value and a low-voltage protection signal is received, adjust the opening degree of the electronic expansion valve.

In the technical solution, the starting capacity of the indoor unit of the air conditioner is lower than or equal to the capacity threshold value, so that the operating load of the air conditioner is lower, and the opening degree of the electronic expansion valve is lower. When the starting capacity of the indoor unit of the air conditioner is lower than or equal to the capacity threshold value, and a low-voltage protection signal of the outdoor unit of the air conditioner is received, the low-voltage protection signal has higher probability of false alarm caused by low operating load of the air conditioner and low opening degree of the electronic expansion valve. The air conditioner is not controlled to stop and remove obstacles at the moment, but the opening degree of the electronic expansion valve is adjusted. If the false alarm is caused by low operating load of the air conditioner and low opening degree of the electronic expansion valve, after the opening degree of the electronic expansion valve is adjusted, the refrigerant further fills the pipeline. At the moment, the low pressure of the outdoor unit rises to be higher than the low-pressure protection threshold value, low-pressure faults are eliminated, the outdoor unit does not send low-pressure protection signals, and the air conditioner can resume normal operation. By applying the technical solution provided in embodiments of the present disclosure, when the starting capacity of the indoor unit is low, the shutdown of the air conditioner caused by the false alarm of a low-voltage protection signal due to the fact that the operating load of the air conditioner is low and the opening degree of the electronic expansion valve is low can be avoided, the frequent false shutdown caused by the fact that the starting capacity of the indoor unit of the air conditioner is lower, the reliability of the air conditioner can be effectively improved, and the comfort of a user for using the air conditioner is further improved.

In the above technical solution, preferably, the processor is further used for: after the opening degree of the electronic expansion valve is adjusted, starting timing; when the timing reaches a first preset time length, if a low-voltage protection signal is still received, continuing timing; otherwise, controlling the first protection accumulation value to be increased by 1, and controlling the air conditioner to continue to operate.

According to the technical solution, since the refrigerant enters the pipeline for a certain time after the opening degree of the electronic expansion valve is increased, the timing is started after the opening degree of the electronic expansion valve is adjusted, and whether the low-voltage fault of the outdoor unit is eliminated or not is judged after the timing reaches a first preset time length; if the low-voltage fault of the outdoor unit is not eliminated, namely the low-voltage protection signal is still received, timing is continued, and waiting is performed for the refrigerant to further enter the pipeline; if the low-voltage fault of the outdoor unit is eliminated, a low-voltage protection signal is not received any more, which indicates that the air conditioner can resume normal operation at the moment. 1 is added to the first protection accumulation value at the moment, the number of times that the fault takes a first preset time length and then resumes normal operation are recorded, and the air conditioner is controlled to continue to operate.

In any of the technical solutions, the processor is preferably further used for: when the timing reaches a second preset time length, if the low-voltage protection signal is still received, controlling the air conditioner to stop operating and sending out prompt information; otherwise, controlling the second protection accumulation value to be increased by 1, and controlling the air conditioner to continue to operate.

In the technical solution, when the opening degree of the electronic expansion valve is adjusted and the timing reaches a first preset time length, but the low-voltage fault of the outdoor unit is not eliminated, and the timing is continued and reaches a second preset time length. Whether the low-voltage fault of the outdoor unit is eliminated or not is judged again. If the low-voltage protection signal is still received at the moment, the low-voltage fault is not false alarm caused by low starting capacity of the indoor unit, so the air conditioner needs to be controlled to stop operating and send out prompt information. the user is prompted that the air conditioner has a fault, and the fault cannot be automatically eliminated, so that the user contacts maintenance personnel for door maintenance at first time; if the timing reaches the second preset time length, the low-voltage fault of the outdoor unit is eliminated, the low-voltage protection signal is not received any more, the air conditioner can resume normal operation at the moment. 1 is added to the second protection accumulation value at the moment, the number of times that the fault takes a second preset time length and then resumes normal operation are recorded, and the air conditioner is controlled to continue to operate.

In any of the technical solutions, the processor is preferably further used for: reducing operating frequency of the outdoor unit.

According to the technical solution, with the operating frequency of the outdoor unit of the air conditioner being higher, the corresponding pressure value in the normal pipe is higher, and the operating frequency of the outdoor unit is further reduced under the condition that a low-voltage fault is not eliminated after a first preset time length. The low-voltage fault can be recovered more quickly, and the air conditioner returns to normal operation more quickly.

In any of the technical solutions, the processor is preferably further used for: while the step of adjusting the opening degree of the electronic expansion valve is performed, removing the correction value for the indoor unit; while the step of controlling the air conditioner to continue to operate is performed, restoring the correction value for indoor unit.

In the technical solution, in the practical application of the air conditioner, there is an correction value for indoor unit aiming at sensor error values, such as an ambient temperature correction amount, an exhaust temperature correction amount, an evaporator outlet temperature correction amount and the like, and the correction amounts enable the operating frequency of the outdoor unit to be additionally increased over the original techniques so as to ensure that the temperature regulation effect of the air conditioner is consistent with user settings. Therefore, when the outdoor unit sends out a low-voltage protection signal, the correction value for the indoor unit is removed, so that the operating frequency of the outdoor unit returns to the original operating frequency, and the speed of low-voltage fault removal can be accelerated. Meanwhile, after the low-voltage fault is eliminated, while the step of controlling the air conditioner to continuously operate is performed, the correction value for the indoor unit is restored, so that the temperature regulation effect of the air conditioner is guaranteed.

In any of the above technical solutions, the processor is preferably further used for: continuously acquiring the first protection accumulation value and the second protection accumulation value in a third preset time length; the first protection accumulation value reaching a first protection threshold value, and/or the second protection accumulation value reaching a second protection threshold value, controlling the air conditioner to stop operating and sending out prompt information.

According to the technical solution, the first protection accumulation value and the second protection accumulation value are continuously acquired within a third preset time length, and when the first protection accumulation value reaches the first protection threshold value and/or the second protection accumulation value reaches the second protection threshold value, the air conditioner is indicated to have too many times of low-voltage faults in a short time, and low-voltage protection signals are not false alarms caused by low starting capacity of the indoor unit. Therefore, the air conditioner is controlled to stop operating, fault prompt information is sent to a user to prompt the user that the air conditioner has a fault, and the fault cannot be automatically eliminated, so that the user contacts maintenance personnel to go on door for maintenance at first time.

In any of the technical solutions, the processor is preferably further used for: adjusting an opening of the electronic expansion valve to an initial opening degree; or adjusting an opening of the electronic expansion valve to a maximum opening degree; or adjusting an opening of the electronic expansion valve to increase a preset opening degree.

In the technical solution, the step of adjusting the opening degree of the electronic expansion valve specifically comprises adjusting the opening of the electronic expansion valve to the initial opening degree so as to enable the air conditioner to operate in an initial state; or the step of adjusting the opening degree of the electronic expansion valve is specifically to adjust the opening of the electronic expansion valve to the maximum opening degree, so that low-pressure faults can be eliminated at the fastest speed; or the step of adjusting the opening degree of the electronic expansion valve specifically comprises adjusting the electronic expansion valve to increase the preset opening degree, so that low-pressure faults can be automatically eliminated according to the preset step.

According to a third aspect of the present disclosure, there is provided in embodiments an air conditioner including the control device of an air conditioner as set forth in any one of the above technical solutions, and therefore, the air conditioner includes all the advantages of the control device of an air conditioner as set forth in any one of the above technical solutions.

Additional aspects and advantages of the present disclosure will be set forth in part in the description which follows, and in part will be obvious from the description, or may be learned by practice of the present disclosure.

BRIEF DESCRIPTION OF THE DRAWINGS

The foregoing and/or additional aspects and advantages of the present disclosure will be apparent from and elucidated with reference to the embodiments described hereinafter with reference to the accompanying drawings, in which.

DETAILED DESCRIPTION

In order that the above objects, features and advantages of the present disclosure may be more clearly understood, the present disclosure is described in further detail below with reference to the accompanying drawings and detailed description. It should be noted that the embodiments and features in the embodiments of the present disclosure may be combined with one another without conflict.

In the following description, numerous specific details are set forth in order to provide a thorough understanding of the present disclosure, but the present disclosure may be practiced otherwise than as described herein, and therefore, the scope of the present disclosure is not limited to the specific embodiments disclosed below.

A control method of an air conditioner, a control device of an air conditioner, and the air conditioner according to some embodiments of the present disclosure will be described with reference to FIGS. 1 to 9.

Figure 1:
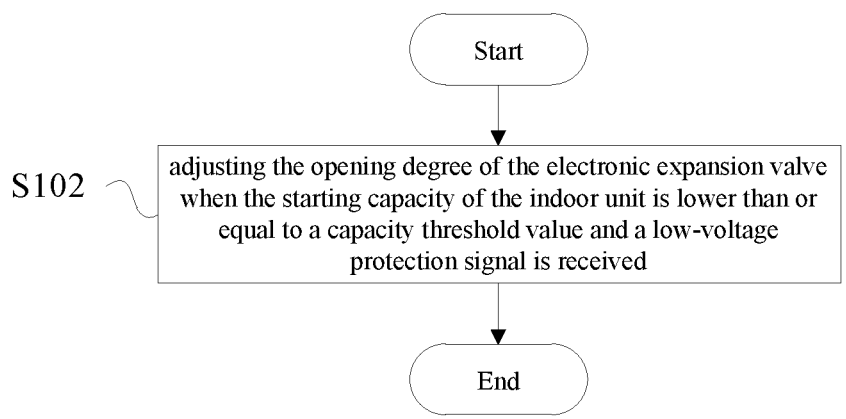
FIG. 1 illustrates a flowchart of a control method of an air conditioner according to an embodiment of the present disclosure.

As shown in FIG. 1, in an embodiment of the first aspect of the present disclosure, there is provided a control method of an air conditioner, the air conditioner including at least one indoor unit and one outdoor unit, the control method including:

S102, adjusting an opening degree of an electronic expansion valve when a starting capacity of the indoor unit is lower than or equal to a capacity threshold value and a low-voltage protection signal is received.

In the embodiment, the starting capacity of the indoor unit of the air conditioner is lower than or equal to the capacity threshold value, so that the operating load of the air conditioner is lower, and the opening degree of the electronic expansion valve is lower. When the starting capacity of the indoor unit of the air conditioner is lower than or equal to the capacity threshold value, and a low-voltage protection signal of the outdoor unit of the air conditioner is received, the low-voltage protection signal has higher probability of false alarm caused by low operating load of the air conditioner and low opening degree of the electronic expansion valve. The air conditioner is not controlled to stop and remove obstacles at the moment, but the opening degree of the electronic expansion valve is adjusted. If the false alarm is caused by low operating load of the air conditioner and low opening degree of the electronic expansion valve, after the opening degree of the electronic expansion valve is adjusted, the refrigerant further fills the pipeline. At the moment, the low pressure of the outdoor unit rises to be higher than the low-pressure protection threshold value, low-pressure faults are eliminated, the outdoor unit does not send low-pressure protection signals, and the air conditioner can resume normal operation. By applying the technical solution provided in embodiments of the present disclosure, when the starting capacity of the indoor unit is low, the shutdown of the air conditioner caused by the false alarm of a low-voltage protection signal due to the fact that the operating load of the air conditioner is low and the opening degree of the electronic expansion valve is low can be avoided, frequent false shutdown caused by the fact that the starting capacity of the indoor unit of the air conditioner is low is avoided, the reliability of the air conditioner can be effectively improved, and the comfort of a user for using the air conditioner is further improved.

Specifically, when the air conditioner is started, whether the starting capacity of the indoor unit of the air conditioner is lower than or equal to a capacity threshold value is judged. If the starting capacity of the indoor unit is lower than or equal to the capacity threshold value, when a low-voltage protection signal of the outdoor unit is received, the electronic expansion valves of the indoor unit and the outdoor unit are controlled to increase the opening degree, the operating load of the air conditioner is increased, and the quantity of refrigerant passing through the electronic expansion valve is increased. When the refrigerant further fills the pipeline, the low-voltage fault of the outdoor unit is eliminated, the outdoor unit does not send a low-voltage protection signal, and the air conditioner is controlled to resume normal operation. Frequent shutdown of the air conditioner due to false alarm of the low-voltage protection signal is avoided, and the reliability of the air conditioner and the comfortableness of a user for using the air conditioner are improved.

Figure 2:
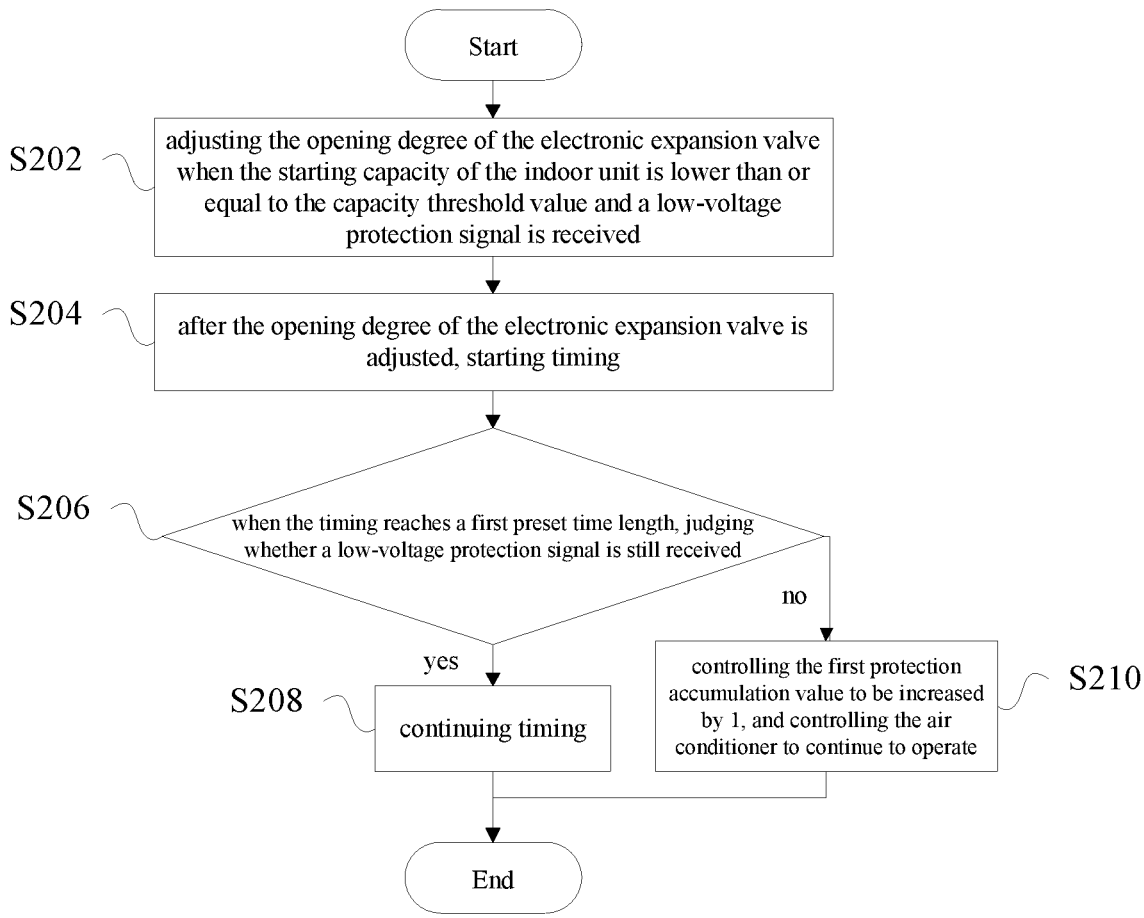
FIG. 2 illustrates a flowchart of a control method of an air conditioner according to another embodiment of the present disclosure.

In one embodiment of the present disclosure, preferably, as shown in FIG. 2, the control method of an air conditioner includes:

S202, adjusting the opening degree of the electronic expansion valve when the starting capacity of the indoor unit is lower than or equal to a capacity threshold value and a low-voltage protection signal is received;

S204, starting timing after the opening degree of the electronic expansion valve is adjusted;

S206, when the timing reaches a first preset time length, judging whether a low-voltage protection signal is still received, if so, entering S208, if not, entering S210;

S208, continuing timing;

S210, controlling the first protection accumulation value to be increased by 1, and controlling the air conditioner to continue to operate.

In the embodiment, since the refrigerant needs a certain time to enter the pipeline after the opening degree of the electronic expansion valve is increased, the timing is started after the opening degree of the electronic expansion valve is adjusted, and whether the low-voltage fault of the outdoor unit is eliminated or not is judged after the timing reaches a first preset time length; if the low-voltage fault of the outdoor unit is not eliminated, namely the low-voltage protection signal is still received, timing is continued, and waiting is performed for the refrigerant to further enter the pipeline; if the low-voltage fault of the outdoor unit is eliminated, a low-voltage protection signal is not received any more, indicating that the air conditioner can resume normal operation at the moment. 1 is added to the first protection accumulation value at the moment, the number of times that the fault takes a first preset time length and then resumes normal operation are recorded, and the air conditioner is controlled to continue to operate.

Figure 3:
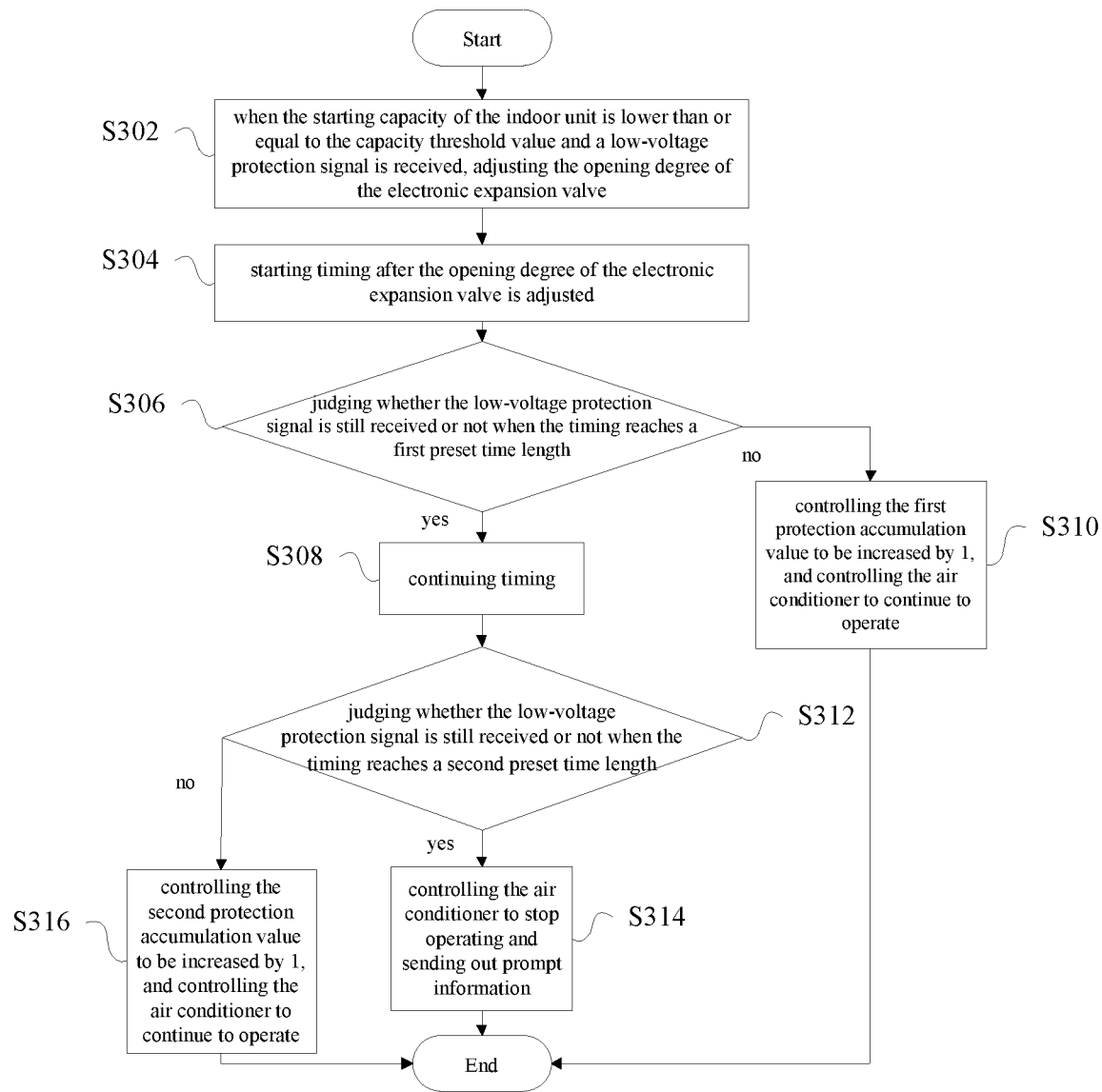
FIG. 3 illustrates a flowchart of a control method of an air conditioner according to yet another embodiment of the present disclosure.

In one embodiment of the present disclosure, preferably, as shown in FIG. 3, the control method of an air conditioner includes:

S302, when the starting capacity of the indoor unit is lower than or equal to a capacity threshold value and a low-voltage protection signal is received, adjusting the opening degree of the electronic expansion valve;

S304, starting timing after adjusting the opening degree of the electronic expansion valve;

S306, when the timing reaches a first preset time length, judging whether a low-voltage protection signal is still received, if so, entering S308, if not, entering S310;

S308, continuing timing;

S310, controlling the first protection accumulation value to be increased by 1, and controlling the air conditioner to continuously operate;

S312, when the timing reaches a second preset time length, judging whether a low-voltage protection signal is still received, if so, entering S314, and if not, entering S316;

S314, controlling the air conditioner to stop operating and sending out prompt information;

S316, controlling the second protection accumulation value to be increased by 1, and controlling the air conditioner to continue to operate.

In the embodiment, when the opening degree of the electronic expansion valve is adjusted and the timing reaches a first preset time length, but the low-voltage fault of the outdoor unit is not eliminated, and the timing is continued and reaches a second preset time length, whether the low-voltage fault of the outdoor unit is eliminated or not is judged again. If the low-voltage protection signal is still received at the moment, the low-voltage fault is not false alarm caused by low starting capacity of the indoor unit, so the air conditioner needs to be controlled to stop operating and send out prompt information. The user is prompted that the air conditioner has a fault, and the fault cannot be automatically eliminated, so that the user contacts maintenance personnel for door maintenance at first time; if the timing reaches the second preset time length, and the low-voltage fault of the outdoor unit is eliminated, the low-voltage protection signal is not received any more, and the air conditioner can resume normal operation at the moment. 1 is added to the second protection accumulation value at the moment, the number of times that the fault takes a second preset time length and then resumes normal operation are recorded, and the air conditioner is controlled to continue to operate.

Figure 4:
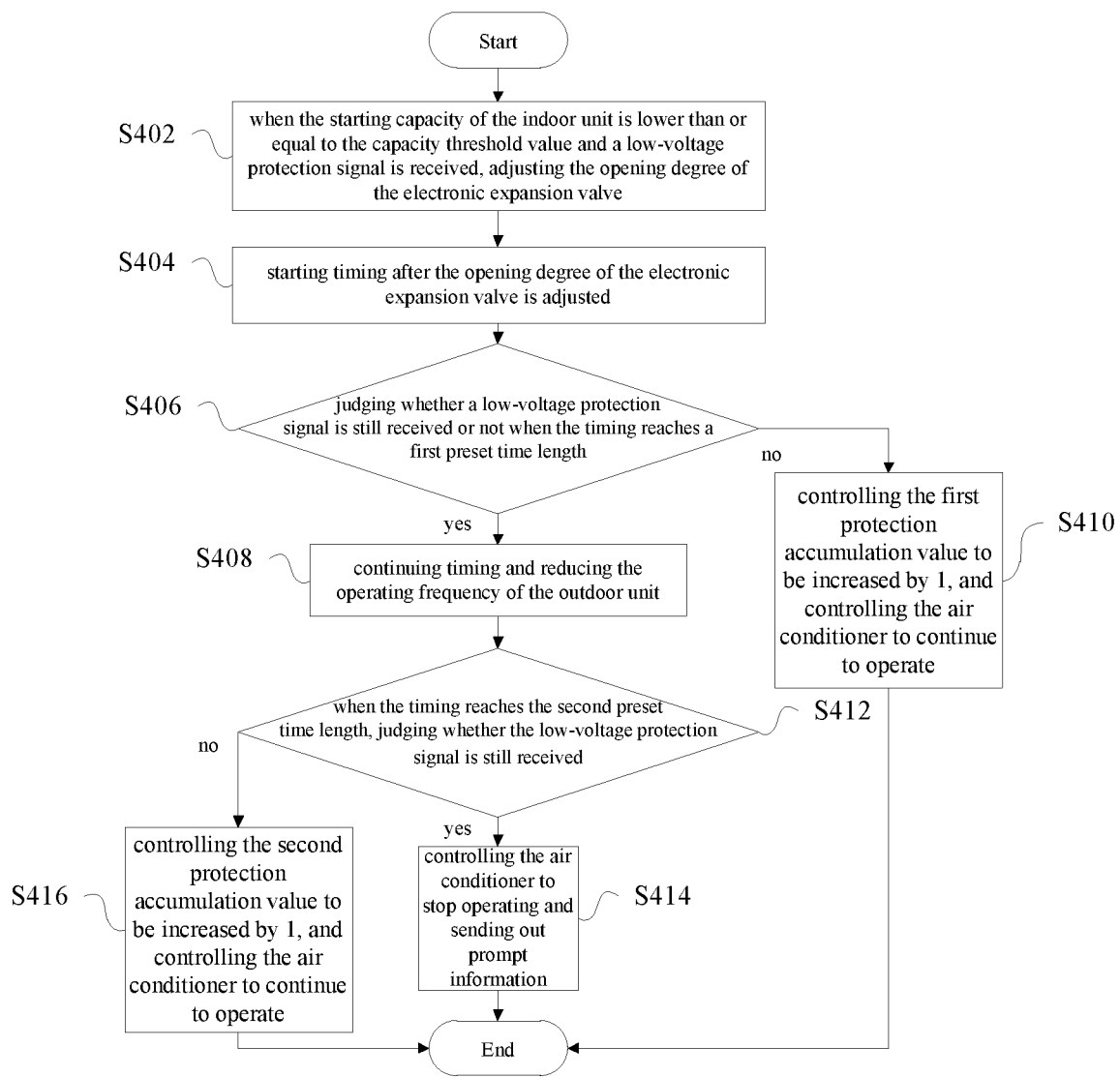
FIG. 4 illustrates a flowchart of a control method of an air conditioner according to yet another embodiment of the present disclosure.

In one embodiment of the present disclosure, preferably, as shown in FIG. 4, the control method of an air conditioner includes:

S402, adjusting the opening degree of the electronic expansion valve when the starting capacity of the indoor unit is lower than or equal to a capacity threshold value and a low-voltage protection signal is received;

S404, starting timing after the opening degree of the electronic expansion valve is adjusted;

S406, when timing reaches a first preset time length, judging whether a low-voltage protection signal is still received, if so, entering S408, if not, entering S410;

S408, continuously timing and reducing the operating frequency of the outdoor unit;

S410, controlling the first protection accumulation value to be increased by 1, and controlling the air conditioner to continuously operate;

S412, when the timing reaches a second preset time length, judging whether a low-voltage protection signal is still received, if so, entering S414, and if not, entering S416;

S414, controlling the air conditioner to stop operating and sending out prompt information;

S416, controlling the second protection accumulation value to be increased by 1, and controlling the air conditioner to continue to operate.

In the embodiment, the higher the operating frequency of the outdoor unit of the air conditioner, the higher the corresponding pressure value in the normal pipe, and under the condition that the low-voltage fault is not eliminated after the first preset time length, the operating frequency of the outdoor unit is further reduced, so that the low-voltage fault can be recovered more quickly, and the air conditioner returns to normal operation more quickly.

Figure 5:
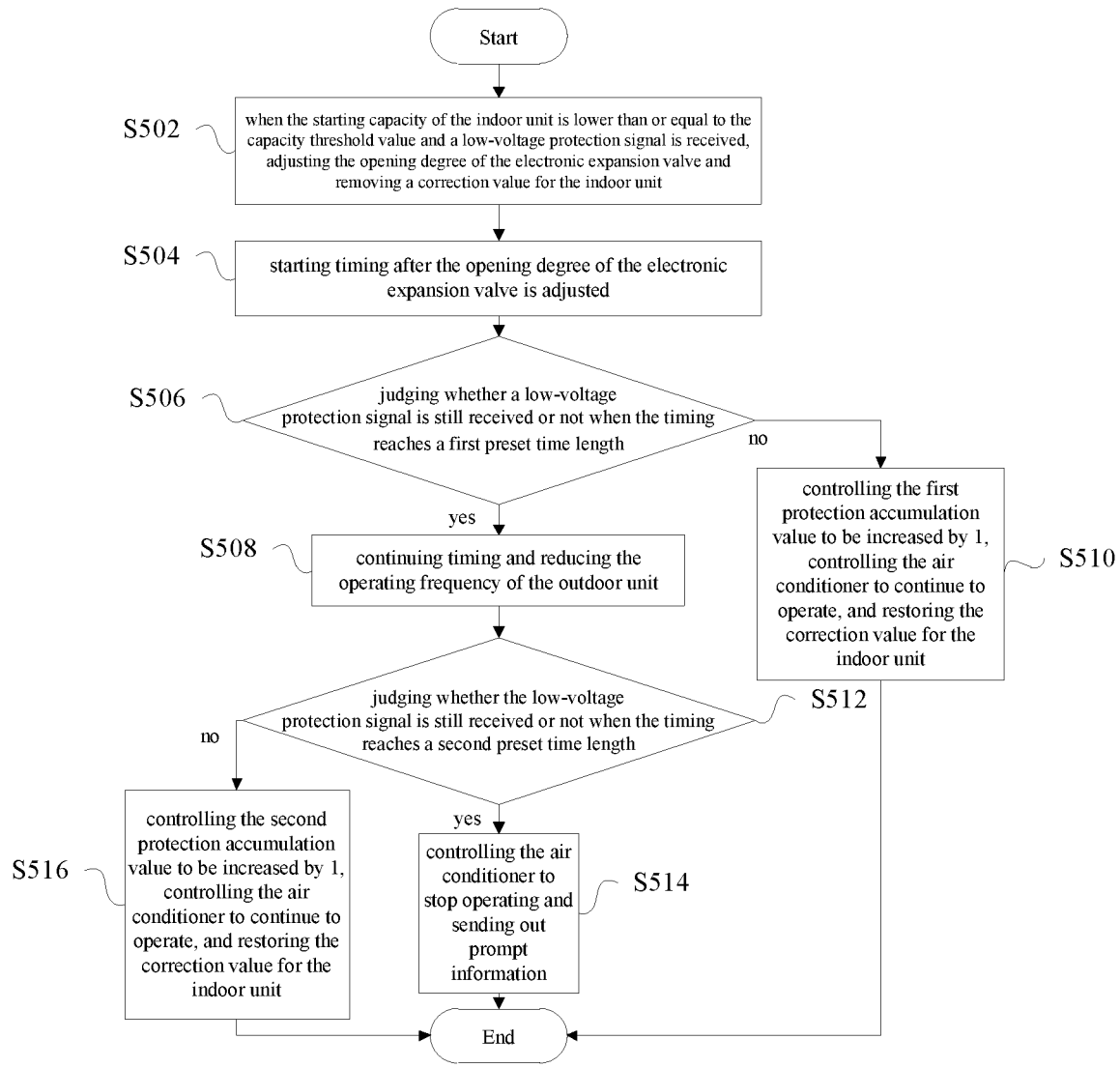
FIG. 5 illustrates a flowchart of a control method of an air conditioner according to yet another embodiment of the present disclosure.

In one embodiment of the present disclosure, preferably, as shown in FIG. 5, the control method of an air conditioner includes:

S502, when the starting capacity of the indoor unit is lower than or equal to a capacity threshold value and a low-voltage protection signal is received, adjusting the opening degree of the electronic expansion valve and clearing the correction value for the indoor unit;

S504, starting timing after the opening degree of the electronic expansion valve is adjusted;

S506, judging whether a low-voltage protection signal is still received when the timing reaches a first preset time length, if so, entering S508, and if not, entering S510;

S508, continuously timing and reducing the operating frequency of the outdoor unit;

S510, controlling the first protection accumulation value to be increased by 1, controlling the air conditioner to continue to operate and restoring the correction value for the indoor unit;

S512, when the timing reaches a second preset time length, judging whether a low-voltage protection signal is still received, if so, entering S514, otherwise, entering S516;

S514, controlling the air conditioner to stop operating and sending out prompt information;

S516, controlling the second protection accumulation value to be increased by 1, and controlling the air conditioner to continue to operate and restoring the correction value for the indoor unit.

In this embodiment, since in the practical application of the air conditioner, there is a correction value for the indoor unit aiming at sensor error values, such as an ambient temperature correction amount, an exhaust temperature correction amount, an evaporator outlet temperature correction amount, and the like, which additionally increase the operating frequency of the outdoor unit over the original techniques to ensure that the temperature adjustment effect of the air conditioner is consistent with the user's setting. When the outdoor unit transmits a low-voltage protection signal, the correction value for the indoor unit is removed, so that the operating frequency of the outdoor unit returns to the original operating frequency, and the speed of low-voltage fault removal can be accelerated. Meanwhile, after the low-voltage fault is eliminated, in the step of controlling the air conditioner to continue to operate, simultaneously, the correction value for the indoor unit is restored, so that the temperature regulation effect of the air conditioner is guaranteed.

Figure 6:
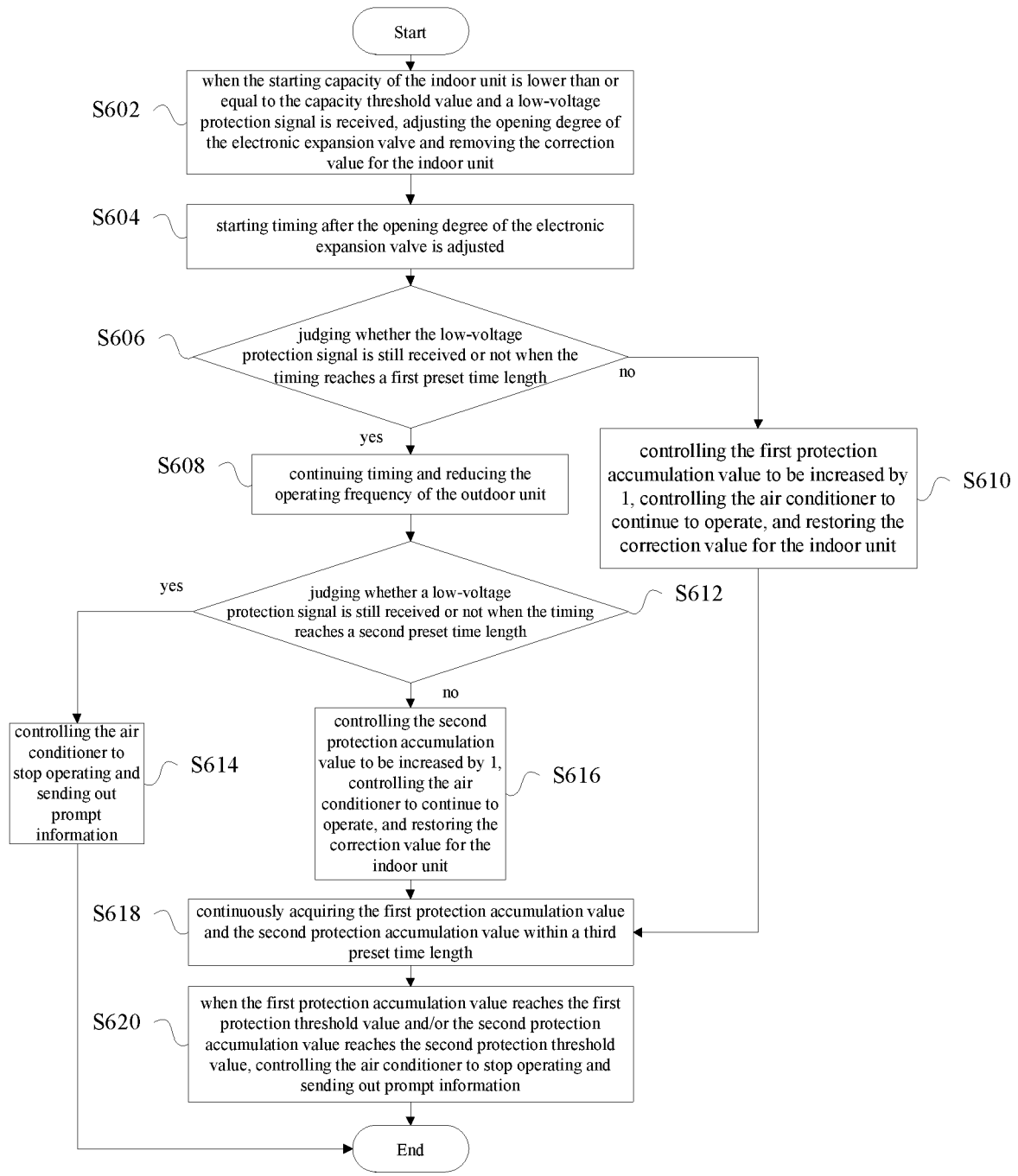
FIG. 6 illustrates a flowchart of a control method of an air conditioner according to yet another embodiment of the present disclosure.

In one embodiment of the present disclosure, preferably, as shown in FIG. 6, the control method of an air conditioner includes:

S602, when the starting capacity of the indoor unit is lower than or equal to the capacity threshold value and a low-voltage protection signal is received, adjusting the opening degree of the electronic expansion valve and removing the correction value for the indoor unit;

S604, starting timing after adjusting the opening degree of the electronic expansion valve;

S606, when the timing reaches a first preset time length, judging whether a low-voltage protection signal is still received, if so, entering S608, if not, entering S610;

S608, continuing timing and reducing the operating frequency of the outdoor unit;

S610, controlling the first protection accumulation value to be increased by 1, controlling the air conditioner to continue to operate and restoring the correction value for the indoor unit;

S612, when the timing reaches a second preset time length, judging whether a low-voltage protection signal is still received, if so, entering S614, and if not, entering S616;

S614, controlling the air conditioner to stop operating and sending out prompt information;

S616, controlling the second protection accumulation value to be increased by 1, controlling the air conditioner to continue to operate and restoring the correction value for the indoor unit;

S618, continuously acquiring the first protection accumulation value and the second protection accumulation value within a third preset time length;

S620, when the first protection accumulation value reaches the first protection threshold value and/or the second protection accumulation value reaches the second protection threshold value, controlling the air conditioner to stop operating and sending out prompt information.

In the embodiment, the first protection accumulation value and the second protection accumulation value are continuously acquired within a third preset time length. When the first protection accumulation value reaches the first protection threshold value and/or the second protection accumulation value reaches the second protection threshold value, the air conditioner is indicated to have too many times of low-voltage faults in a short time, and the low-voltage protection signal is not false alarm caused by the low starting capacity of the indoor unit. Therefore, the air conditioner is controlled to stop operating, fault prompt information is sent to a user to prompt the user that the air conditioner has a fault and the fault cannot be automatically eliminated, so that the user contacts maintenance personnel to go on door for maintenance at first time.

Preferably, the first protection threshold value is set to 3 and the second protection threshold value is set to 2. When the first protection accumulation value is greater than or equal to 3 and/or the second protection threshold value is greater than or equal to 2, the low-voltage protection of the air conditioner is stopped and cannot be automatically restored.

In one embodiment of the present disclosure, preferably, the step of adjusting the opening degree of the electronic expansion valve is as follows: adjusting an opening of the electronic expansion valve to an initial opening degree; or adjusting an opening of the electronic expansion valve to a maximum opening degree; or adjusting an opening of the electronic expansion valve to increase a preset opening degree.

In the embodiment, the step of adjusting the opening degree of the electronic expansion valve specifically means to adjust the opening of the electronic expansion valve to the initial opening degree, so that the air conditioner operates in an initial state; or the step of adjusting the opening degree of the electronic expansion valve is specifically to adjust the opening of the electronic expansion valve to the maximum opening degree, so that low-pressure faults can be eliminated at the fastest speed; or the step of adjusting the opening degree of the electronic expansion valve specifically comprises adjusting the electronic expansion valve to increase the preset opening degree, so that low-pressure faults can be automatically eliminated according to the preset step.

Figure 7:
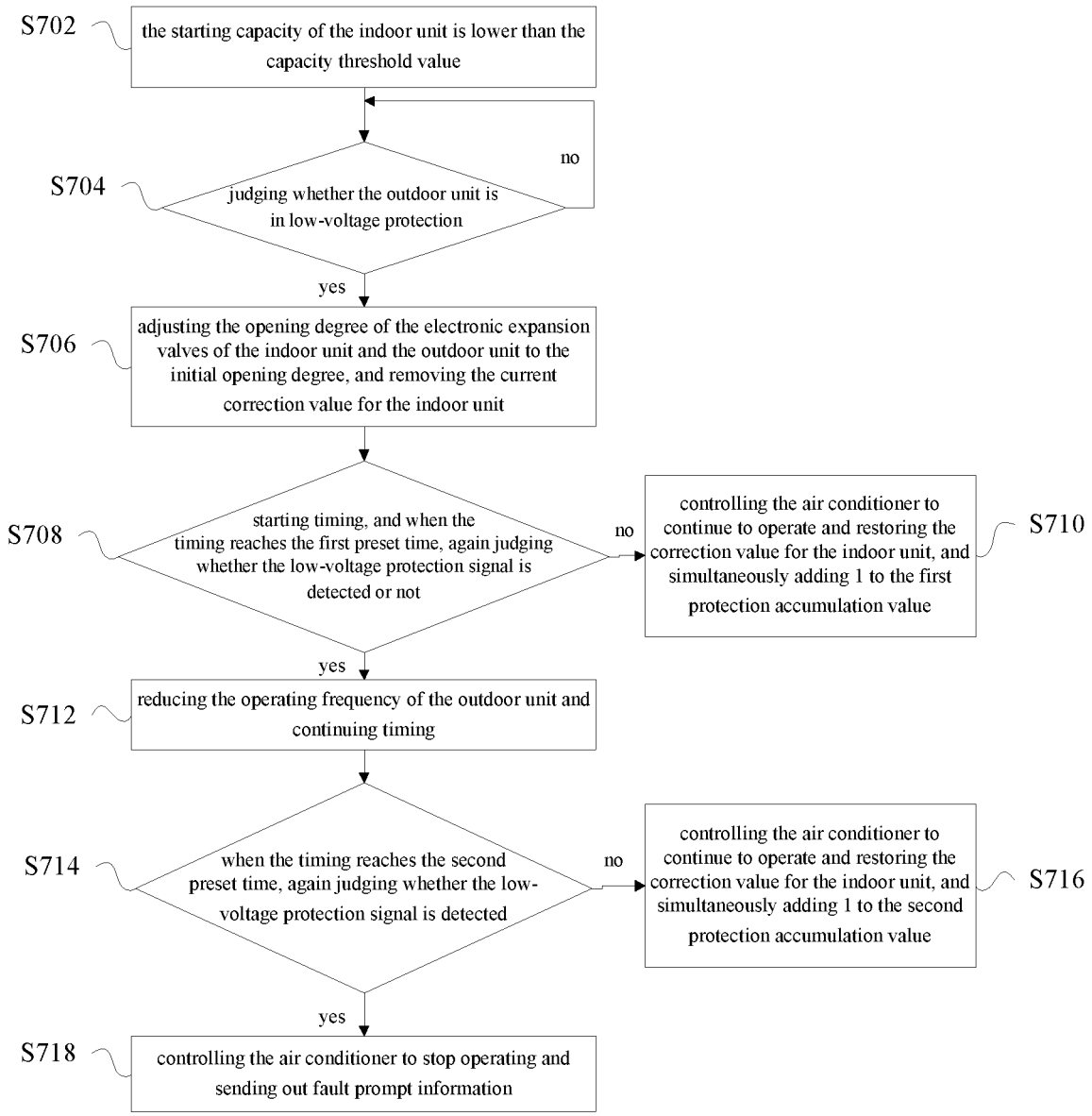
FIG. 7 illustrates a flowchart of a control method of an air conditioner according to yet another embodiment of the present disclosure.

In one embodiment of the present disclosure, preferably, as shown in FIG. 7, the control method of an air conditioner includes:

S702, starting capacity of the indoor unit is lower than a capacity threshold value;

S704, judging whether the outdoor unit is in low-voltage protection, if so, entering S706, if not, returning to S704;

S706, adjusting the opening degree of the electronic expansion valves of the indoor unit and the outdoor unit to the initial opening degree, and removing the current correction value for the indoor unit;

S708, starting timing, again judging whether a low-voltage protection signal is detected after the timing reaches a first preset time, if so, entering S712, otherwise, entering S710;

S710, controlling the air conditioner to continue to operate and restoring the correction value for the indoor unit, and simultaneously adding 1 to the first protection accumulation value;

S712, reducing the operating frequency of the outdoor unit and continuing timing;

S714, when the timing reaches the second preset time, again judging whether the low-voltage protection signal is detected, if so, entering S718, otherwise, entering S716;

S716, controlling the air conditioner to continue to operate and restoring the correction value for the indoor unit, and simultaneously adding 1 to the second protection accumulation value;

S718, controlling the air conditioner to stop operating and sending out fault prompt information.

In the embodiment, when the starting capacity of the indoor unit is lower than the capacity threshold value, whether the low-voltage protection signal of the outdoor unit is received is judged. When the judgment result is yes, the opening degrees of the electronic expansion valves of the indoor unit and the outdoor unit are adjusted to the initial opening degree, and the current correction value for the indoor unit is removed. Timing is initiated. When the timing reaches a first preset time, whether a low-voltage protection signal is detected is judged again. When the judgment result is no, the air conditioner is controlled to continue to operate and recover the correction value for the indoor unit, and simultaneously 1 is added to the first protection accumulation value; when the judgment result is yes, the operating frequency of the outdoor unit is reduced and timing is continued; when the timing reaches a second preset time, whether a low-voltage protection signal is detected or not is judged again. When the judgment result is no, the air conditioner is controlled to continue to operate, the correction value for the indoor unit is restored, and meanwhile, the second protection accumulation value is increased by 1; and when the judgment result is yes, the air conditioner is controlled to stop operating and fault prompt information is sent out.

Figure 8:
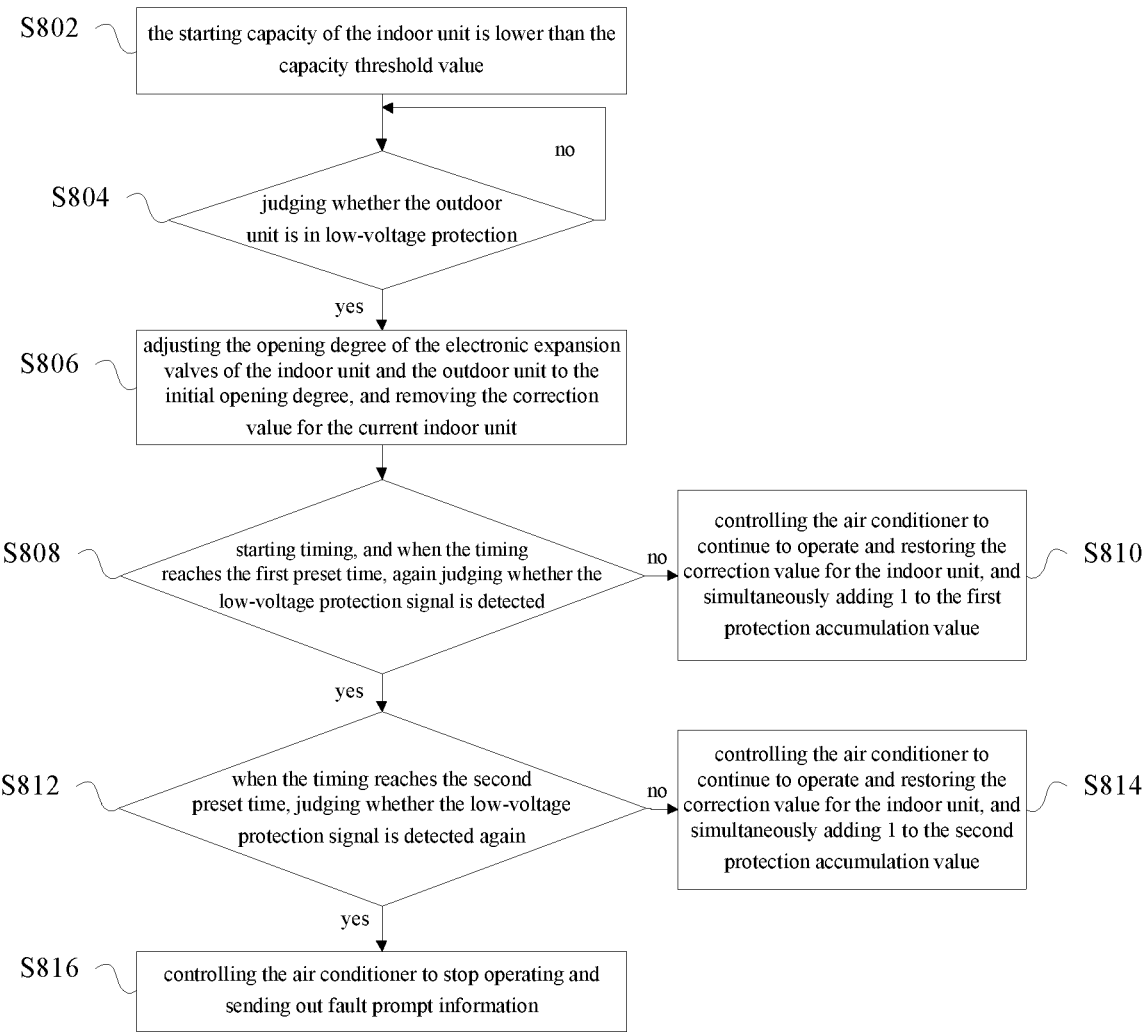
FIG. 8 illustrates a flowchart of a control method of an air conditioner according to yet another embodiment of the present disclosure.

In one embodiment of the present disclosure, preferably, as shown in FIG. 8, the control method of an air conditioner includes:

S802, starting capacity of the indoor unit being lower than a capacity threshold value;

S804, judging whether the outdoor unit is in low-voltage protection, if so, entering S806, and if not, returning to S804;

S806, adjusting the opening degree of the electronic expansion valves of the indoor unit and the outdoor unit to the initial opening degree, and removing the correction value for the current indoor unit;

S808, starting timing, judging whether a low-voltage protection signal is detected again after the timing reaches a first preset time, if so, entering S812, otherwise, entering S810;

S810, controlling the air conditioner to continue to operate and restoring the correction value for the indoor unit, and simultaneously adding 1 to the first protection accumulation value;

S812, when the timing reaches a second preset time, judging whether a low-voltage protection signal is detected again, if so, entering S816, otherwise, entering S814;

S814, controlling the air conditioner to continue to operate and restoring the correction value for the indoor unit, and simultaneously adding 1 to the second protection accumulation value;

S816, controlling the air conditioner to stop operating and sending out fault prompt information.

In the embodiment, when the starting capacity of the indoor unit is lower than the capacity threshold value, whether the low-voltage protection signal of the outdoor unit is received is judged. When the judgment result is yes, the opening degrees of the electronic expansion valves of the indoor unit and the outdoor unit are adjusted to the initial opening degree, and the current correction value for the indoor unit is removed. Timing is initiated. When the timing reaches a first preset time, whether a low-voltage protection signal is detected is judged again. When the judgment result is no, the air conditioner is controlled to continue to operate and restore the correction value for the indoor unit, and simultaneously 1 is added to the first protection accumulation value; when the judgment result is yes, timing is continued; when the timing reaches a second preset time, whether a low-voltage protection signal is detected or not is judged again. When the judgment result is no, the air conditioner is controlled to continue to operate, the correction value for the indoor unit is restored, and meanwhile, the second protection accumulation value is increased by 1; and when the judgment result is yes, the air conditioner is controlled to stop operating and fault prompt information is sent out.

Figure 9:
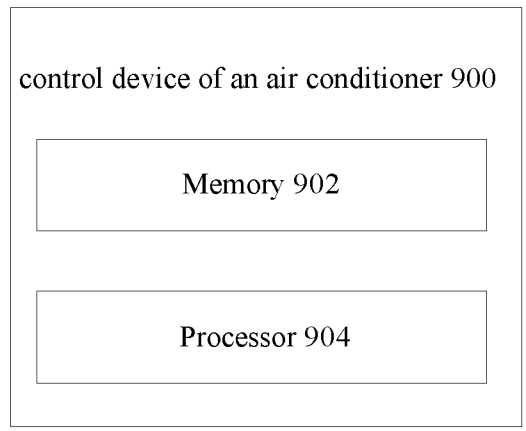
FIG. 9 illustrates a block diagram of a control device of an air conditioner according to an embodiment of the present disclosure.

As shown in FIG. 9, in an embodiment of the second aspect of the present disclosure, there is provided a control device 900 of an air conditioner, the air conditioner including at least one indoor unit and one outdoor unit, the control device including: a memory 902 and a processor 904; the memory 902 being used for storing a computer program; the processor 904 being configured to execute the computer program to: when the starting capacity of the indoor unit is lower than or equal to the capacity threshold value and a low-voltage protection signal is received, adjust the opening degree of the electronic expansion valve.

In the embodiment, the starting capacity of the indoor unit of the air conditioner is lower than or equal to the capacity threshold value, so that the operating load of the air conditioner is lower, and the opening degree of the electronic expansion valve is lower. When the starting capacity of the indoor unit of the air conditioner is lower than or equal to the capacity threshold value, and a low-voltage protection signal of the outdoor unit of the air conditioner is received, the low-voltage protection signal has higher probability of false alarm caused by low operating load of the air conditioner and low opening degree of the electronic expansion valve. The air conditioner is not controlled to stop and remove obstacles at the moment, but the opening degree of the electronic expansion valve is adjusted. If the false alarm is caused by the low operating load of the air conditioner and the low opening degree of the electronic expansion valve, after the opening degree of the electronic expansion valve is adjusted, the refrigerant further fills the pipeline. At the moment, the low pressure of the outdoor unit rises to be higher than the low-pressure protection threshold value, low-pressure faults are eliminated, the outdoor unit does not send low-pressure protection signals, and the air conditioner can resume normal operation. By applying the technical solution provided in embodiments of the present disclosure, when the starting capacity of the indoor unit is low, the shutdown of the air conditioner caused by the false alarm of a low-voltage protection signal due to the fact that the operating load of the air conditioner is low and the opening degree of the electronic expansion valve is low can be avoided, the frequent false shutdown caused by the fact that the starting capacity of the indoor unit of the air conditioner is low is avoided, the reliability of the air conditioner can be effectively improved, and the comfort of a user for using the air conditioner is further improved.

In one embodiment of the present disclosure, the processor is preferably further configured to: after the opening degree of the electronic expansion valve is adjusted, start timing; when the timing reaches a first preset time length, if a low-voltage protection signal is still received, continue timing; otherwise, control the first protection accumulation value to be increased by 1, and control the air conditioner to continue to operate.

In the embodiment, since the refrigerant needs a certain time to enter the pipeline after the opening degree of the electronic expansion valve is increased, the timing is started after the opening degree of the electronic expansion valve is adjusted, and whether the low-voltage fault of the outdoor unit is eliminated or not is judged after the timing reaches a first preset time length; if the low-voltage fault of the outdoor unit is not eliminated, namely the low-voltage protection signal is still received, timing is continued, and waiting is performed for the refrigerant to further enter the pipeline; if the low-voltage fault of the outdoor unit is eliminated, a low-voltage protection signal is not received any more, indicating that the air conditioner can resume normal operation at the moment. 1 is added to the first protection accumulation value at the moment, the number of times that the fault takes a first preset time length and then resumes normal operation are recorded, and the air conditioner is controlled to continue to operate.

In one embodiment of the present disclosure, the processor is preferably further configured to: when the timing reaches a second preset time length, if the low-voltage protection signal is still received, control the air conditioner to stop operating and send out prompt information; otherwise, control the second protection accumulation value to be increased by 1, and control the air conditioner to continue to operate.

In the embodiment, when the opening degree of the electronic expansion valve is adjusted and the timing reaches a first preset time length, but the low-voltage fault of the outdoor unit is not eliminated, the timing is continued and reaches a second preset time length. Whether the low-voltage fault of the outdoor unit is eliminated or not is judged again, and if the low-voltage protection signal is still received at the moment, the low-voltage fault is not false alarm caused by low starting capacity of the indoor unit, so the air conditioner needs to be controlled to stop operating and send out prompt information. The user is prompted that the air conditioner has a fault, and the fault cannot be automatically eliminated, so that the user contacts maintenance personnel for door maintenance at first time; if the timing reaches the second preset time length, the low-voltage fault of the outdoor unit is eliminated, and the low-voltage protection signal is not received any more, the air conditioner can resume normal operation at the moment. 1 is added to the second protection accumulation value at the moment, the number of times that the fault takes a second preset time length and then resumes normal operation are recorded, and the air conditioner is controlled to continue to operate.

In one embodiment of the present disclosure, the processor is preferably further configured to: reduce operating frequency of the outdoor unit.

In the embodiment, the higher the operating frequency of the outdoor unit of the air conditioner, the higher the corresponding pressure value in the normal pipe, and under the condition that the low-voltage fault is not eliminated after the first preset time length, the operating frequency of the outdoor unit is further reduced, so that the low-voltage fault can be recovered more quickly, and the air conditioner returns to normal operation more quickly.

In one embodiment of the present disclosure, the processor is preferably further configured to: in the step of adjusting the opening degree of the electronic expansion valve, simultaneously, remove the correction value for the indoor unit; and restore the correction value for the indoor unit in the step of controlling the air conditioner to continue to operate.

In this embodiment, since in the practical application of the air conditioner, there is a correction value for the indoor unit aiming at sensor error values, such as an ambient temperature correction amount, an exhaust temperature correction amount, an evaporator outlet temperature correction amount, and the like, which additionally increase the operating frequency of the outdoor unit over the original techniques to ensure that the temperature adjustment effect of the air conditioner is consistent with the user's settings. When the outdoor unit transmits a low-voltage protection signal, the correction value for the indoor unit is removed, so that the operating frequency of the outdoor unit returns to the original operating frequency, and the speed of low-voltage fault removal can be accelerated. Meanwhile, after the low-voltage fault is eliminated, the step of controlling the air conditioner to continue to operate is performed, and meanwhile, the correction value for the indoor unit is restored, so that the temperature regulation effect of the air conditioner is guaranteed.

In one embodiment of the present disclosure, the processor is preferably further configured to: continuously acquire the first protection accumulation value and the second protection accumulation value within a third preset time length; when the first protection accumulation value reaches the first protection threshold value and/or the second protection accumulation value reaches the second protection threshold value, control the air conditioner to stop operating and send out prompt information.

In the embodiment, the first protection accumulation value and the second protection accumulation value are continuously acquired within the third preset time length. When the first protection accumulation value reaches the first protection threshold value and/or the second protection accumulation value reaches the second protection threshold value, the air conditioner is indicated to have too many times of low-voltage faults in a short time, and the low-voltage protection signal is not false alarm caused by the low starting capability of the indoor unit. Therefore, the air conditioner is controlled to stop operating, and fault prompt information is sent to a user to prompt the user that the air conditioner has a fault and the fault cannot be automatically eliminated, so that the user contacts maintenance personnel to go on door for maintenance at the first time.

In one embodiment of the present disclosure, the processor is preferably further configured to: adjust the opening of the electronic expansion valve to an initial opening degree; or adjust an opening of the electronic expansion valve to a maximum opening degree; or adjust an opening of the electronic expansion valve to increase a preset opening degree.

In the embodiment, the step of adjusting the opening degree of the electronic expansion valve specifically means to adjust the opening of the electronic expansion valve to the initial opening degree, so that the air conditioner operates in an initial state; or the step of adjusting the opening degree of the electronic expansion valve is specifically to adjust the opening of the electronic expansion valve to the maximum opening degree, so that low-pressure faults can be eliminated at the fastest speed; or the step of adjusting the opening degree of the electronic expansion valve specifically comprises adjusting the electronic expansion valve to increase the preset opening degree, so that low-pressure faults can be automatically eliminated according to the preset step.

In an embodiment of the third aspect of the present disclosure, there is provided an air conditioner including the control device of an air conditioner as described in any of the above embodiments, and therefore, the air conditioner includes all the advantages of the control device of an air conditioner as described in any of the above embodiments.

In the description of the present disclosure, the term "plurality" refers to two or more, unless explicitly defined otherwise. The orientation or positional relationship indicated by the terms "upper", "lower", and the like is based on the orientation or positional relationship shown in the drawings, merely for convenience in describing the present disclosure and simplifying the description, and does not indicate or imply that the referenced device or element must have a particular orientation, or must be constructed and operative in a particular orientation. Therefore, they should not be construed as limiting the present disclosure. The terms "connected", "mounted", "fixed", and the like are to be construed broadly, e.g., "connected" may refer to a fixed connection, or may refer to a detachable connection, or an integral connection. They may be connected directly or indirectly through an intermediary. The specific meaning of the above terms in this application will be understood by those of ordinary skill in the art, as the case may be.

In the description of the present disclosure, the description of the terms "an embodiment", "some embodiments", "particular embodiments", etc., means that a particular feature, structure, material, or characteristic described in connection with the embodiment or example is included in at least one embodiment or example of the present disclosure. In this application, the schematic representation of the above terms does not necessarily refer to the same embodiment or example. Furthermore, the particular features, structures, materials, or characteristics described may be combined in any suitable manner in any one or more embodiments or examples.

The foregoing is merely a preferred embodiment of the present disclosure and is not intended to limit the present disclosure, as various modifications and changes therein will occur to those skilled in the art. Any modifications, equivalents, improvements, etc. that come within the spirit and principles of this application are intended to be included within the scope of this application.

What is claimed is:

1. A control method of an air conditioner, the air conditioner comprising at least one indoor unit and one outdoor unit, the control method comprises:
    confirming that a starting capacity of the indoor unit is less than or equal to a capacity threshold value;
    confirming that a low-voltage protection signal is received;
    adjusting an opening degree of an electronic expansion valve when the starting capacity of the indoor unit is less than or equal to a capacity threshold value and the low-voltage protection signal is received;
    adjusting the opening degree of the electronic expansion valve further comprises removing a correction value for the indoor unit; and
    controlling the air conditioner to continue to operate further comprises restoring the correction value for the indoor unit.

2. The control method of the air conditioner as claimed in claim 1, further comprising:
    confirming that the opening degree of the electronic expansion valve has been adjusted and starting timing;
    when the timing reaches a first preset time length, detecting that the low-voltage protection signal is received, and continuing the timing; otherwise,
    controlling a first protection accumulation value to be increased by 1, and controlling the air conditioner to continue to operate.

3. The control method of the air conditioner as claimed in claim 2, the step of continuing the timing further comprises:
    when the timing reaches a second preset time length, detecting that the low-voltage protection signal is received, controlling the air conditioner to stop operating and sending out prompt information; otherwise controlling a second protection accumulation value to be increased by 1, and controlling the air conditioner to continue to operate.

4. The control method of the air conditioner as claimed in claim 2 the step of continuing the timing further comprises:
    reducing an operating frequency of the outdoor unit.

5. The control method of the air conditioner as claimed in claim 2, the step of controlling the air conditioner to continue to operate further comprises:
    continuously acquiring the first protection accumulation value and the second protection accumulation value in a third preset time length; and
    after the first protection accumulation value reaches a first protection threshold value, and/or the second protection accumulation value reaches a second protection threshold value, controlling the air conditioner to stop operating and sending out the prompt information.

6. The control method of the air conditioner as claimed in claim 1, the step of adjusting the opening degree of the electronic expansion valve specifically comprises:
    adjusting an opening of the electronic expansion valve to an initial opening degree; or
    adjusting an opening of the electronic expansion valve to a maximum opening degree; or
    adjusting an opening of the electronic expansion valve to increase a preset opening degree.

7. A control device of an air conditioner, the air conditioner comprising at least one indoor unit and one outdoor unit, the control device comprises:
a memory for storing a computer program;
a processor for executing the computer program, and confirming that a starting capacity of the indoor unit is less than or equal to a capacity threshold value and confirming that a low-voltage protection signal is received and adjusting an opening degree of an electronic expansion valve when the starting capacity of the indoor unit is less than or equal to a capacity threshold value and the low-voltage protection signal is received, the processor is configured to:
adjust the opening degree of the electronic expansion valve and remove a correction value for the indoor unit; and
control the air conditioner to continue to operate and restore the correction value for the indoor unit.

8. The control device of the air conditioner as claimed in claim 7, the processor is further configured to:
confirm that the opening degree of the electronic expansion valve has been adjusted and start timing;
after the timing reaches a first preset time length, detect that the low-voltage protection signal is received, and continue the timing; otherwise,
control a first protection accumulation value to be increased by 1, and control the air conditioner to continue to operate.

9. The control device of the air conditioner as claimed in claim 8, the processor is further configured to:
after the timing reaches a second preset time length, detect that the low-voltage protection signal is received, control the air conditioner to stop operating and send out prompt information; otherwise
control a second protection accumulation value to be increased by 1, and control the air conditioner to continue to operate.

10. The control device of the air conditioner as claimed in claim 8, the processor is further configured to:
reduce an operating frequency of the outdoor unit.

11. The control device of the air conditioner as claimed in claim 8, the processor is further configured to:
continuously acquire the first protection accumulation value and the second protection accumulation value in a third preset time length; and
after the first protection accumulation value reaches a first protection threshold value, and/or the second protection accumulation value reaches a second protection threshold value, control the air conditioner to stop operating and send out the prompt information.

12. The control device of the air conditioner as claimed in claim 7, the processor is further configured to:
adjust an opening of the electronic expansion valve to an initial opening degree; or
adjust an opening of the electronic expansion valve to a maximum opening degree; or
adjust an opening of the electronic expansion valve to increase a preset opening degree.

13. An air conditioner comprising the control device of the air conditioner as claimed in claim 7.

14. An air conditioner comprising the control device of the air conditioner as claimed in claim 9.

15. An air conditioner comprising the control device of the air conditioner as claimed in claim 10.

16. An air conditioner comprising the control device of the air conditioner as claimed in claim 8.

17. An air conditioner comprising the control device of the air conditioner as claimed in claim 11.

18. An air conditioner comprising the control device of the air conditioner as claimed in claim 12.

* * * * *